3 Sheets--Sheet 1.

W. MUIR.

Sewing-Machines.

No. 5,752. Reissued Feb. 3, 1874.

WITNESSES.
R. F. Morris
J. P. McElroy.

INVENTOR.
William Muir per
Brown Brothers
Attorneys.

A.N. PHOTO-LITHOGRAPHIC Co. N.Y. (OSBORNE'S PROCESS.)

3 Sheets--Sheet 2.
W. MUIR.
Sewing-Machines.
No. 5,752. Reissued Feb. 3, 1874.
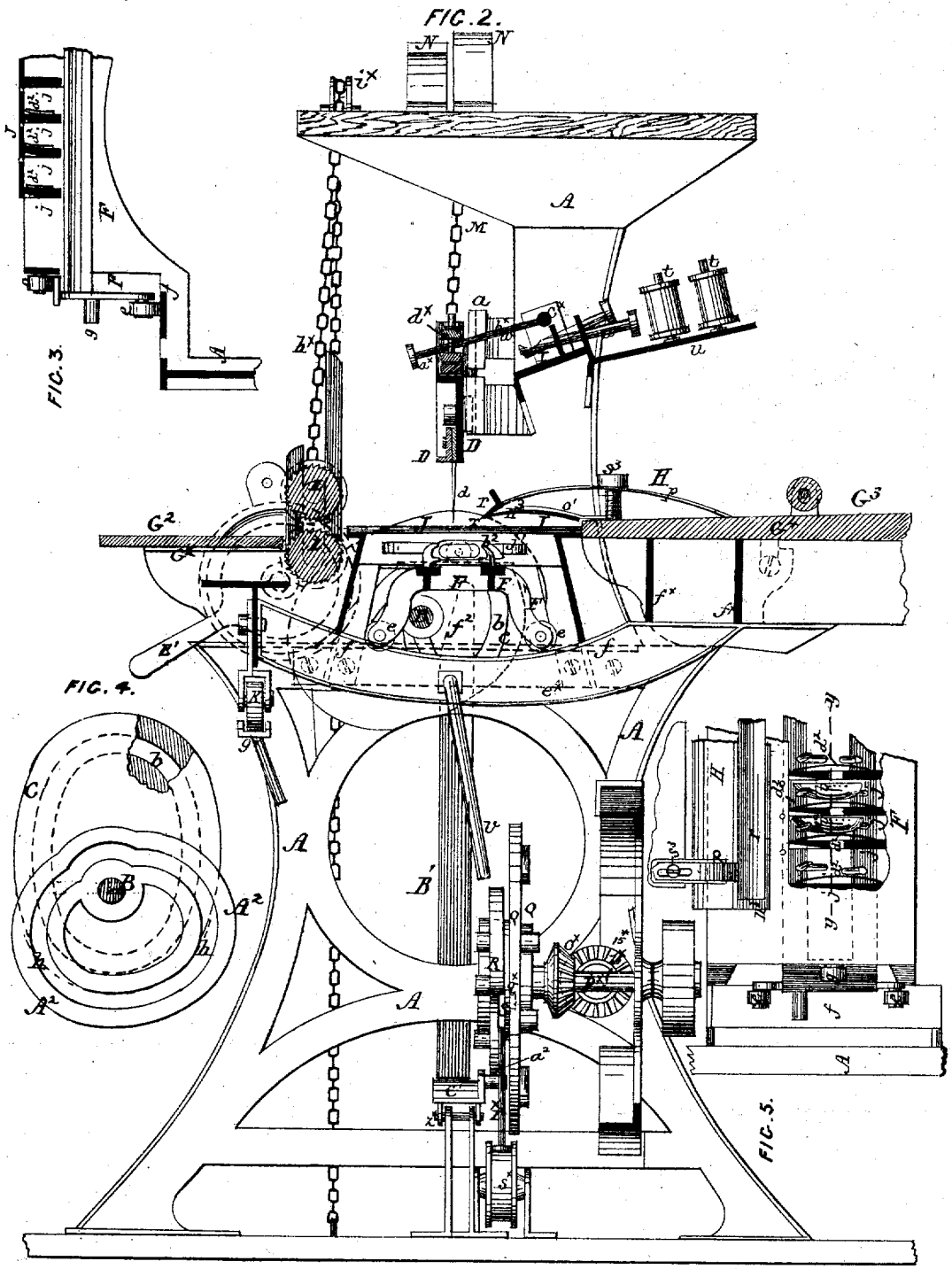
WITNESSES.
Robt. Morris
J. P. McCloy.
INVENTOR.
William Muir per
Brown Brothers
Attorneys.
A.M. PHOTO-LITHOGRAPHIC Co. N.Y. (OSBORNE'S PROCESS)

3 Sheets--Sheet 3.

W. MUIR.

Sewing-Machines.

No. 5,752. Reissued Feb. 3, 1874.

WITNESSES.
Robert Morris
J. P. McCloy

INVENTOR.
William Muir per
Brown Brothers
Attorneys.

AM. PHOTO-LITHOGRAPHIC Co. N.Y. (OSBORNE'S PROCESS.)

UNITED STATES PATENT OFFICE.

WILLIAM MUIR, OF MONTREAL, CANADA.

IMPROVEMENT IN SEWING-MACHINES.

Specification forming part of Letters Patent No. 89,064, dated April 20, 1869; reissue No. 5,752, dated February 3, 1874; application filed April 3, 1872.

*To all whom it may concern:*

Be it known that I, WILLIAM MUIR, of Montreal, in the Province of Quebec and Dominion of Canada, have invented an Improvement in Sewing-Machines, of which the following is a specification:

This invention more especially relates to embroidering or quilting fabrics, and it will be particularly described with reference thereto, wherein the goods are moved along to the needle by the feed acting at regular intervals with regard to the stitching mechanism—that is, feeding at each and every stitch.

By the invention the forward feed is automatically changed—that is, made longer or shorter as to the length of its stroke—which obviously relatively increases or decreases the length of stitch, and the main object of this automatic change of the feed is to secure uniform stitches in a line of stitching or sewing that from end to end is serpentine or sinuous or zigzag in shape.

My invention consists, first, of a feeding mechanism adapted to have a forward and lateral motion, combined with a pattern-cam, and connected and operating substantially as hereinafter described, so as to vary the forward motion of the feed for sewing sinuous, zigzag, or other stitches; second, of novel constructions and arrangements of the mechanical devices aforesaid, to more effectually secure the main object above stated, all of which will be hereinafter particularly described.

In the accompanying plates of drawings, my improvements in sewing-machines are illustrated.

Figure 1:
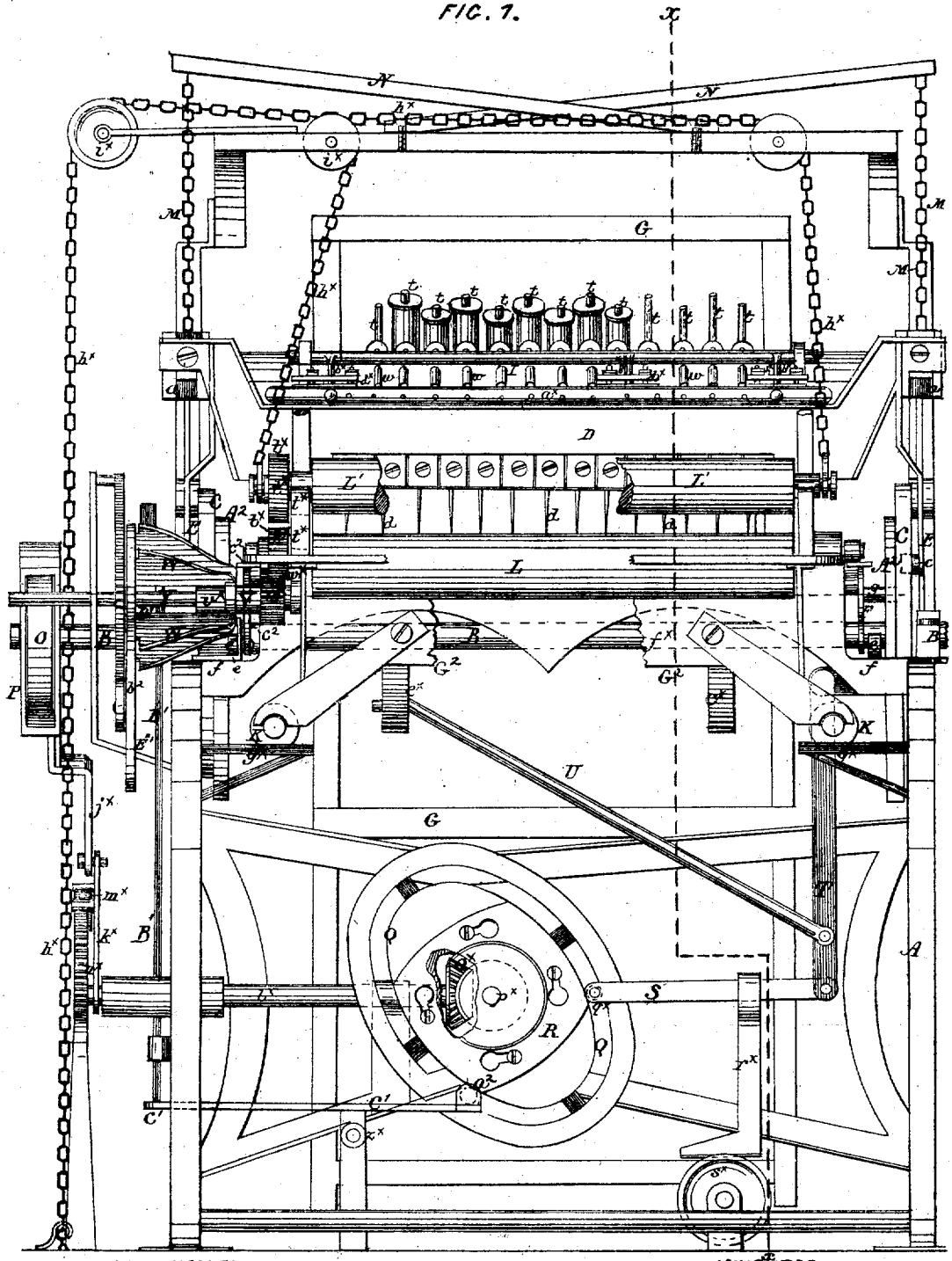
Figure 6:
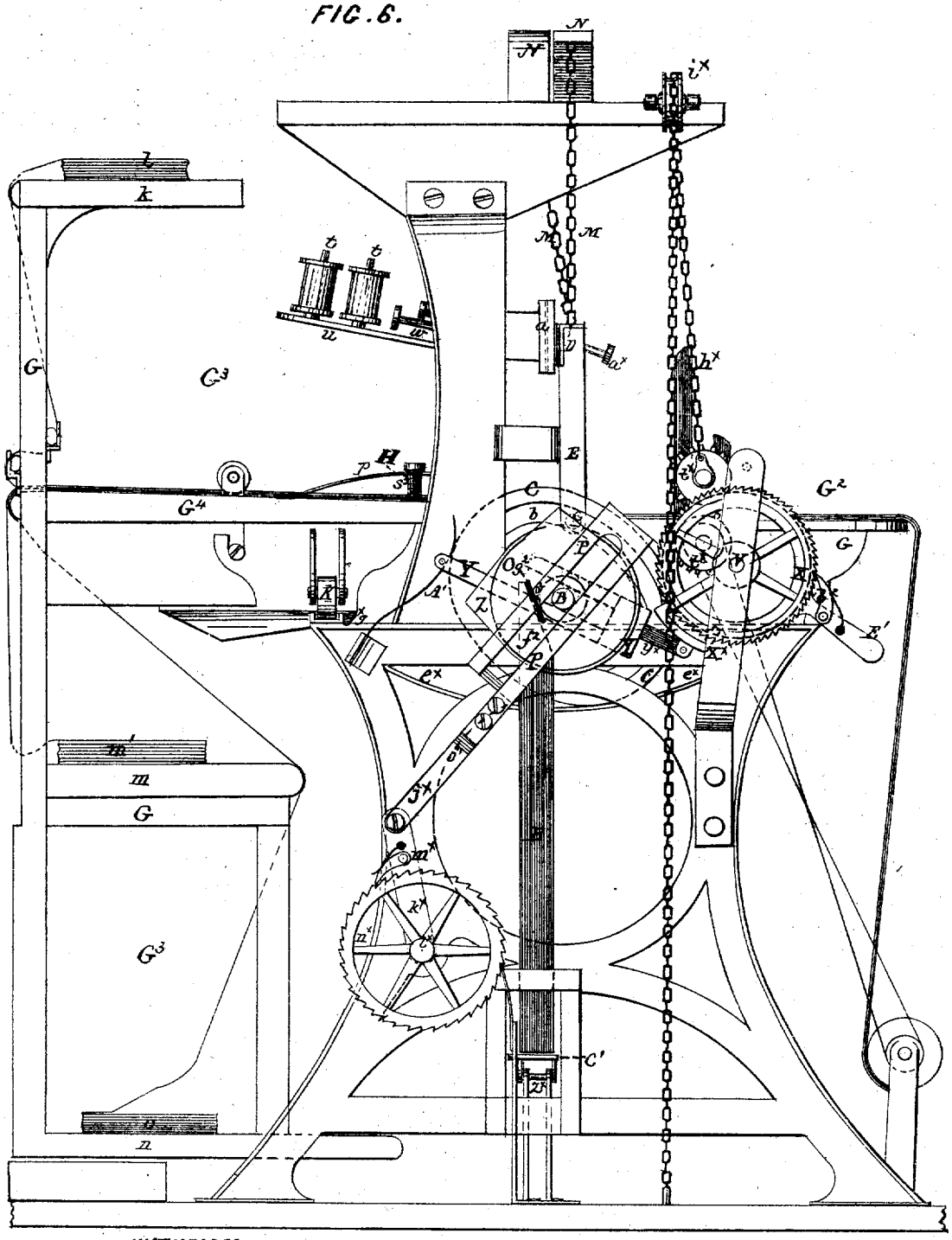

In Plate 1, Figure 1 is a front view of a machine constructed according thereto. In Plate 2, Fig. 2, a transverse vertical section in plane of line *x x*, Fig. 1, Plate 1; Fig. 3, a horizontal section in plane of line *y y*, Fig. 5; Fig. 4, a face view in detail of some of the parts to the machine; Fig. 5, a plan view of a portion of the machine. In Plate 3, Fig. 6, an end view of the machine.

In the drawings my improvements are shown as applied to a multiple sewing-machine, and similar letters of reference indicate like parts.

A represents the frame of a sewing-machine constructed and arranged according to my improvements, said frame being made of any suitable material, and of any proper form to receive and support the various working and stationary parts. B is the driving-shaft, arranged horizontally across the width of the frame A, and adapted, through mechanism secured and connected thereto, to operate the needle-bar D, the shuttle-carrier frame F, the framing G, carrying the fabric to be sewed, and the feed-rollers L L′. The needle-bar D at each end is adapted to move up and down in parallel fixed guide-posts *a a* at each side of the frame A, and to so move it there is hung to each of its ends one end of a pitman rod or bar, E, both of which, at their lower ends, through rollers C, are arranged to work in the cam-grooves *b* of the cams C of the driving-shaft B. The cam-grooves *b* are of such shape as not only to give the up-and-down movement to the needle-bar, but to so move it at the proper time for the needles *d*, carried by it, to operate in unison with the other parts of the machine. The needle-bar D at each end is suspended by chains M from the outer ends of spring-bars N, secured to the upper portion of frame A. Suspending the needle-bar D, as above described, not only facilitates the upward movement of the needle-bar, but, in a great degree, relieves the cams for operating the needle-bar of friction and wear and tear. The needle-bar D, in addition to carrying the needles, also carries spools of thread, one for each needle. These spools are placed on inclined spindles *t* of an inclined board, *u*, at the rear of the needle-bar, and the threads from them pass through eyes of rods *w* in a frame, I, at the rear of the needle-bar, and thence through holes in a bar, $a^{\times}$, which is attached to the front ends of arms $b^{\times}$, (the rear ends of which arms $b^{\times}$ are secured to a shaft, $c^{\times}$, in the frame I,) passing through clamps $d^{\times}$, attached to the upper part of the needle-bar D, and thence to the needle-eyes. By the rising of the bar $a^{\times}$ with the needle-bar D, the proper tension is given to the threads. The shuttle-carrier frame F in its construction is adapted to carry a number of shuttles equal to the number of needles which the needle-bar D is adapted to receive, and it is located in the frame A, upon or in suitable ways thereof, relatively to the races or guideways *j* for the shuttles $b^2$, so as to move the shuttles forward and backward through their races $j$. The number of races $j$ equals the number of shuttles, and they are permanently attached to the frame A in parallel planes at right angles to the length of the needle-bar D, and, furthermore, are relatively so arranged with the plane of movement of the needle-bar that the shuttles and the needles will work properly together to produce stitches, as ordinarily in shuttle sewing-machines. The shuttle-carrier frame F, at its lower portion, through rollers running on fixed parallel horizontal parts $f$ of the frame A, is arranged to travel forward and backward to carry the shuttles through their respective races. To automatically operate the shuttle-carrier frame F, it is, at each end, provided with a downward-projecting arm, $C^2$, having at their lower ends a friction-roller, $g$, arranged to work respectively in a similar cam-groove, $h$, of disks $A^2$, secured to the driving-shaft B in proper position therefor. The shape of the grooves $h$ is plainly shown in Fig. 4, Plate 2, and is such as to impart to the shuttle-carrier frame F a reciprocating movement to carry the shuttles forward and backward through their races $j$ in proper time to act in conjunction with the needles to produce stitches. Each shuttle-race $j$, upon one side, is provided with a bent spring, $d^2$, to press against the back of the shuttle moving in the race, and thus to keep the shuttle close to the face of the shuttle-race. This spring $d^2$ is located in shuttle-races $j$, to hold the shuttle close to the opposite face of the guide therefrom until it has passed into the loop of the needle-thread, thus insuring its perfect and proper entrance to the needle-thread loop, and preventing "wabbling." The framing G is in two parts, $G^2$ and $G^3$, connected together by curved metallic bars $e^\times$, having bars $f^\times$, that are parallel with the driving-shaft B. The two-part framing G is placed in the machine between the upright sides of the main frame A, and it is considerably less in width than the inside width of frame A, and, when placed in position, has its part $G^2$ at the front and its part $G^3$ at the rear of the frame A, with the connecting-bars $e^\times$ passing under the shuttle-carrier frame F. The rear part $G^3$ of the framing G is provided with shelves $k$, $m$, and $n$, one above the other, as shown. The shelf $k$ is to receive the lining material $l$; shelf $m$, the wadding $m'$; and shelf $n$, the canvas or other material $o$. This is in case the machine is used to quilt lining or wadding for clothing, &c. From these several shelves, $k$, $m$, and $n$, the respective materials contained by them are passed around suitable guide-rollers of the framing G to a platform or table, $G^4$, of the framing G, so as to bring the wadding $m'$ between the lining $l$ and canvas sheet $o$, with the canvas underneath, producing a material of three thicknesses. The framing G is free of the main frame A, and is provided with rollers K, resting on fixed parallel horizontal ways $g^\times$ of the frame A, so that it can be moved from one side to the other of the frame A, it receiving motion from the cam O, fixed to the driving-shaft B, by and through mechanism constructed and arranged as follows: U, a rod, at one end connected to one of the curved bars $e^\times$ of the framing G, and at the other pivoted to the pendent bar T, that, in turn, at its upper end, is pivoted to the main frame A, and at its lower end to one end of a horizontal rod, S, having at its other end a friction-roller, $q$, moving in the groove of a cam, Q, (shown clearly in Fig. 1,) on a horizontal shaft, $p^\times$, arranged in the frame A below the driving-shaft B, and in a plane at right angles thereto. The horizontal rod S between grooved cam Q and pendent bar T is supported within an upright bar, $r^\times$, resting in its turn upon a friction-wheel, $S^\times$, of the frame A. The shaft $p^\times$, through bevel-gear wheels $O^\times$, is connected to the inner end of a horizontal shaft, $l^\times$, turning in bearings of the frame A. This shaft $l^\times$, at its outer end, has a ratchet-wheel, $r^\times$, for which is a pawl, $m^\times$, hung to a radius-bar, $k^\times$, which is loose on the shaft $l^\times$, but is connected at its upper end with arm $j^\times$ of a yoke, P, arranged upon the driving-shaft B in position to be operated by the cam O. The feed-rollers L L′ are arranged upon the front part $G^2$ of the framing G, one directly over the other, and parallel to the needle-bar D. The feed-rollers are in the same vertical axial plane, and the lower roller, L, works in fixed bearings, whereas the upper one, L′, is arranged in its bearings so that it can be raised and lowered at pleasure, and thus, when desired, removed or elevated entirely from the lower roller, L. To facilitate the raising of the upper roller, L′, chains $h^\times$ are connected to each end of it, and then passed upward over pulleys $l^\times$, and the two are there united, so that both ends of the upper roller will be simultaneously raised. The feed-rollers L L′ are connected together by gear-wheels $t^\times$, so that revolving one roller revolves the other, and the lower feed-roller is revolved through mechanism connecting it with the cam Z of the driving-shaft. The gear-wheel of the lower feed-roller, L, meshes into a loose pinion gear-wheel, $w^\times$, of a horizontal shaft, V. This pinion $w^\times$ is provided with an elongated hub, $V^\times$, which enters a collar of drum W, and the two are connected by means of a spline, so that the hub $v^\times$ may slide within the drum W, but the drum and pinion-hub turn together. To the outer end of the drum W is attached a ratchet-wheel, X, operated by a pawl hung to the outer end of an arm, $Y^\times$, connected with yoke U, arranged upon the driving-shaft B in position to be operated by the cam Z. A spring, $A^1$, holds the inner end of the yoke in contact with the cam Z.

The presser-foot H (see Fig. 2) is of a length equal to the width, or nearly so, of the framing-bar, and it is composed of a transversely-curved plate, $n^3$, attached at each end to strips O′ O′, by which it is secured to the table $G^4$ of framing G, at the rear of needle-bar A, and of a rail or bar, $r$, disposed to bear along the upper side of plate $n^2$, and secured at each end to the front end of bent spring-bands $p$ $p$. Through each spring-band $p$ passes the threaded shank of a threaded or shouldered screw, $S^3$, screwing into the platform $G^4$ or part attached thereto, so that, screwing the screws $S^3$ in or out, the pressure of the rail $r$ on the plate $n^3$ can be increased or decreased at pleasure. The compound fabric, laid as described upon the table $G^4$, is passed under the plate $n^3$, and thence under the needle-bar D, over cloth-plate J, to and between the feed-rollers L L′, and thence to a take-up roller, operated through a belt connected with some part of the driving mechanism. The cloth-plate J is perforated at proper points for the needles of the needle-bar D to pass through it.

By the several arrangements of mechanism herein described for operating the needle-bar D, the shuttle-carrier frame F, the framing G, and the feed-rollers L L′, upon the rotation of the driving-shaft B, motion is imparted to them, respectively, as follows: To the needle-bar, a reciprocating vertical movement; to the shuttle-carrier frame, a reciprocating rectilinear movement; to the framing G, an intermittent lateral movement across the plane of travel of the shuttle-carrier frame; to the feed-rollers L L′, an intermittent rotary motion.

The dispositions of the several mechanisms provided, as described, to produce the movements above specified of the needle-bar, shuttle-carrier frame, fabric-carrying framing, and feed-rollers, is such, relatively the one to the other, and the several to each other, as to operate the several parts at the proper times to produce, by their combined movement, the stitching of the compound fabric in the direction of its length, and to feed the same, both forward and laterally, under the needle-bar D, the lateral feed of the fabric being insured through the movement of the framing G, to which the fabric is held by the presser-foot H.

It is obvious from the above that the line of stitches in the fabric will be at an angle of inclination to the length of the fabric, the angle depending on the shape of the groove in the cam Q on shaft $p^\times$, because, through such cam, the framing G receives its lateral movement. Therefore, it is plainly manifest, with a proper formation of the groove of the cam, that the movement of the framing G, at any one throw of the ratchet-wheel $n^\times$, can be regulated, and by using cams of varying shapes, rows or lines of stitches can be made of almost any form or direction—as, for instance, sinuous or serpentine, zigzag, and either continuously or broken, or with a straight or serpentine portion connecting the zigzag. In the lateral movement of the framing G, the presser-foot H, the feed-rollers L L′, and the various sheets making the compound fabric, move with it.

To secure a uniform length of stitches in the operation of the sewing-machine above described, and which, as has been hereinbefore stated, was the main object of this invention, the feed-rollers are adapted to be revolved either a greater or lesser distance by the ratchet-wheel X, to feed the fabric forward a greater or less distance, as may be necessary to bring the fabric under the needles, to insure an equal length of stitch.

The arrangement of parts shown in the drawings to secure the above-described variable feed of the feed-rollers L L′ is as follows: B, a bar, made of a wedge shape at one end, $f^2$. This bar is arranged with its wedge-shaped end uppermost and outside of the end of the main frame A, where the mechanism for operating the feed-rollers is located, and in this position, by means of guide-loops, it is sustained, and rests on one end of a horizontal lever, $C^1$, having its fulcrum at $Z^\times$, and provided at its other end with a friction-roller, $a^2$, acted upon by the cam-wheel R, secured to the shaft $p^\times$, hereinbefore referred to.

The bar B′, in its location above described, is, at its upper end, in a plane behind the yoke Y, hereinbefore referred to. The wedge-shaped face $f^2$ of the bar B′ is turned toward the yoke. With a proper construction of the cam R, it is plainly obvious the bar B′ can be raised or lowered, thereby reducing in the one and increasing in the other case the throw of the yoke Y. This results from the fact that the yoke Y is arranged to move across the driving-shaft B, and will be moved forward more or less, according to the distance it is allowed to recede by the bar B.

A limitation of the backward movement of the yoke Y, through the cam R acting on the bar B′, being thus automatically effected, it follows that the ratchet-wheel X, by the succeeding forward movement of the yoke Y, will be rotated in direct proportion thereto—that is, a lesser or greater number of teeth, as the case may be—and, consequently, the feed of the fabric will be made accordingly less or more.

From the above description of the arrangement of the bar B, and its operation in connection with the yoke Y, it is manifest that the degree in which the feed can be varied, by each stroke of the pawl, to rotate the feed-rollers L L′, depends upon the movement of the yoke Y, carrying said pawl, caused by the position of the bar B′, and that, therefore, as said bar B′ derives its movement from the cam R, by changing said cam, and substituting for it another having a different character or form of edge or cam-periphery, the feed will be varied in accordance therewith. Thus, to produce stitches of a uniform or even length—as, for instance, when sewing in a sinuous or serpentine line—it is only necessary to use a cam, R, of the proper shape to cause the feed to be automatically varied in length at the proper times, and, after each stitch, to bring in connection with the lateral movement the fabric at the proper points under the needles relatively to the points at which the needles last entered the goods, to have the length directly between such first and last series to correspond with the length desired for the stitches, whatever may be the deviation of such lines of stitches between the two separate points of entry of the needles into the fabric from the longitudinal line or path of the fabric through the machine.

The principle contained in the above action of a combined lateral and longitudinal feed is, in fact, this: The greater the lateral feed of the fabric the less the longitudinal feed, and vice versa, to produce stitches of a uniform given length.

It is obvious that if the pawl $x^{\times}$ be a multiple pawl, nicer and closer variations of the feed may be made.

Obviously, the operation of the mechanical parts to work the needle-bar, the shuttle-carrier frame G, and the feed-rollers is precisely the same, whether more or less sewing-needles and shuttles are employed; and, further, it is plainly apparent that the machine is adapted for the stitching of fabrics other than that herein described.

On the drum W, hereinbefore referred to, there is fitted loosely a ring, D, having a pawl, $b^2$, attached to it, which engages with the ratchet-wheel X. The ring D is provided with a handle, E′. This loose ring, with its pawl, is designed to serve as a hand-feed.

I am aware of the Letters Patent issued to D. W. G. Humphrey, of Chelsea, Massachusetts, dated August 29, 1865, numbered 49,627, on improvement on button-hole sewing-machine; and, therefore, I do not broadly claim the automatic variation of a feed in all sewing-machines; but What I do claim is—

1. The feeding mechanism, adapted to have a forward and lateral motion, combined with a pattern-cam, and connected by means and operating substantially as described, to vary the forward motion of the feed for sewing sinuous, zigzag, or other stitches, as set forth.

2. In combination with the cams C C and their operating mechanism, the needle-bar D, suspended from the spring-bars N N, substantially as described.

3. The presser-foot H, consisting of a curved plate, $n^2$, rail or bar $r$, spring-bands $p$ $p$, and pressure-regulating screw S, all constructed, arranged, and operating substantially as described.

4. The feed-rollers L L′, in combination with the pinion $W^{\times}$, keyed on the shaft V, the drum W, and ratchet-wheel X, placed loosely on said shaft, and the pawl $x^{\times}$, operated through the cam Z and yoke Y, all arranged and operating substantially as shown and described.

5. The combination of the yoke Y, adjustable bar B′, and the cam Z, arranged substantially as described, for the purpose of regulating the feed movement of the rollers L L′.

6. The combination of the yoke Y, automatically-adjustable bar B′, of taper form, and cam R, substantially as and for the purpose specified.

7. The cam Q, arm S, bar T, and rod U, operated through the cam O, yoke P, pawl $m^{\times}$, and bar $k^{\times}$, substantially as described, for the purpose specified.

8. The framing G, composed of the parts $G^2$ and $G^3$, with the parts $G^3$ provided with shelves or tables, substantially as and for the purpose described.

9. The drum W, loose ring D′, pawl $b^2$, and ratchet-wheel X, substantially as described, for the purpose specified.

The above specification of my improvements in sewing-machines signed by me this 19th day of March, A. D. 1872.

WM. MUIR.

Witnesses:
A. HELLEWELL,
R. COCKBURN.